(12) United States Patent
Nam et al.

(10) Patent No.: US 9,623,486 B2
(45) Date of Patent: Apr. 18, 2017

(54) CUTTING INSERT

(71) Applicant: KORLOY INC., Seoul (KR)

(72) Inventors: Ki-Chan Nam, Cheongju-si (KR);
Wook-Jung Sung, Cheongju-si (KR);
Sang-Yong Lee, Cheongju-si (KR);
Young-Jun Park, Cheongju-si (KR)

(73) Assignee: KORLOY INC., Seoul (KR)

( * ) Notice: Subject to any disclaimer, the term of this patent is extended or adjusted under 35 U.S.C. 154(b) by 232 days.

(21) Appl. No.: 14/403,357

(22) PCT Filed: Apr. 23, 2013

(86) PCT No.: PCT/KR2013/003461
§ 371 (c)(1),
(2) Date: Nov. 24, 2014

(87) PCT Pub. No.: WO2013/187596
PCT Pub. Date: Dec. 19, 2013

(65) Prior Publication Data
US 2015/0174664 A1 Jun. 25, 2015

(30) Foreign Application Priority Data
Jun. 14, 2012 (KR) .................. 10-2012-0063602

(51) Int. Cl.
*B23C 5/00* (2006.01)
*B23B 27/14* (2006.01)
(Continued)

(52) U.S. Cl.
CPC .............. *B23B 27/145* (2013.01); *B23C 5/06* (2013.01); *B23C 5/202* (2013.01);
(Continued)

(58) Field of Classification Search
CPC ................ B23B 27/141; B23B 27/125; B23B 2200/0471; B23B 2200/083;
(Continued)

(56) References Cited

U.S. PATENT DOCUMENTS

| 4,626,140 A | * | 12/1986 | Zweekly | ................ B23B 27/143 407/114 |
| 5,437,522 A | * | 8/1995 | Satran | .................... B23C 5/2213 407/114 |

(Continued)

FOREIGN PATENT DOCUMENTS

| JP | EP 1252955 A1 * 10/2002 ........... B23C 5/1045 |
| JP | 2010-184307 A   8/2010 |

(Continued)

*Primary Examiner* — Will Fridie, Jr.
(74) *Attorney, Agent, or Firm* — Rabin & Berdo, P.C.

(57) ABSTRACT

The purpose of the present invention is to provide a cutting insert which can minimize friction with a chip and maximize heat-radiating performance. To this end, the present invention provides a cutting insert comprising: an upper surface; a lower surface; a plurality of lateral surfaces for connecting the upper surface with the lower surface; a main cutting edge formed between the lateral surface and the upper surface; and a main cutting edge land and a main cutting edge incline formed in series between the main cutting edge and the upper surface, wherein the main cutting edge incline has a first wavy shape in which two or more incline convex parts and two or more incline concave parts are repeated from the main cutting edge land toward the upper surface.

10 Claims, 9 Drawing Sheets

(51) Int. Cl.
*B23C 5/06* (2006.01)
*B23C 5/20* (2006.01)
(52) U.S. Cl.
CPC . *B23B 2200/0471* (2013.01); *B23B 2200/081* (2013.01); *B23B 2200/086* (2013.01); *B23C 2200/0455* (2013.01); *B23C 2200/081* (2013.01); *B23C 2200/087* (2013.01); *B23C 2200/206* (2013.01); *B23C 2210/66* (2013.01); *Y10T 407/245* (2015.01)
(58) Field of Classification Search
CPC ........ B23B 2200/085; B23B 2200/205; B23C 2200/206
See application file for complete search history.

(56) References Cited

U.S. PATENT DOCUMENTS

| | | | | |
|---|---|---|---|---|
| 5,695,303 A | * | 12/1997 | Boianjiu | B23B 27/141 407/114 |
| 5,772,365 A | * | 6/1998 | Vogel | B23C 5/1045 407/114 |
| 6,164,879 A | * | 12/2000 | Krenzer | B23B 27/141 407/114 |
| 6,267,541 B1 | * | 7/2001 | Isakov | B23B 27/143 407/114 |
| 6,599,061 B1 | * | 7/2003 | Nelson | B23B 27/143 407/114 |
| 7,802,946 B2 | | 9/2010 | Ishida | |
| 8,142,113 B2 | | 3/2012 | Ishida | |
| 8,905,685 B2 | * | 12/2014 | Horiike | B23C 5/109 407/113 |
| 9,028,177 B2 | * | 5/2015 | Horiike | B23C 5/109 407/18 |
| 9,278,395 B2 | * | 3/2016 | Matsuo | B23C 5/109 |
| 2008/0260476 A1 | | 10/2008 | Ishida | |
| 2010/0316452 A1 | | 12/2010 | Ishida | |
| 2011/0142555 A1 | | 6/2011 | Yamazaki et al. | |
| 2012/0177452 A1 | | 7/2012 | Konta | |

FOREIGN PATENT DOCUMENTS

| | | | | |
|---|---|---|---|---|
| JP | WO 2013031926 A1 | * | 3/2013 | ........... B23B 51/048 |
| KR | 10-2006-0100287 A | | 9/2006 | |
| KR | 10-0645547 B1 | | 11/2006 | |
| KR | 10-2010-0022681 A | | 3/2010 | |
| KR | 10-2011-0055558 A | | 5/2011 | |
| KR | 10-1067414 B1 | | 9/2011 | |
| KR | 10-2012-0050526 A | | 5/2012 | |

* cited by examiner

CUTTING INSERT

BACKGROUND OF THE INVENTION

1. Field of the Invention

The present invention relates to a cutting insert.

2. Description of the Related Art

Generally, a cutting insert is coupled to a cutting tool mounted on a machine tool, to be used in cutting a workpiece to be cut which consists of iron, nonferrous metals, non-metal materials, etc.

This cutting insert generally has an upper surface, a lower surface, and a plurality of lateral surfaces connecting the upper surfaces and the lower surface. A cutting edge is provided between the lateral and upper surfaces, while there are a cutting edge land surface and a cutting edge rake surface formed in series between the cutting edge and the upper surface. Further, the cutting edge rake surface serves as a chip breaker.

Figure 14:
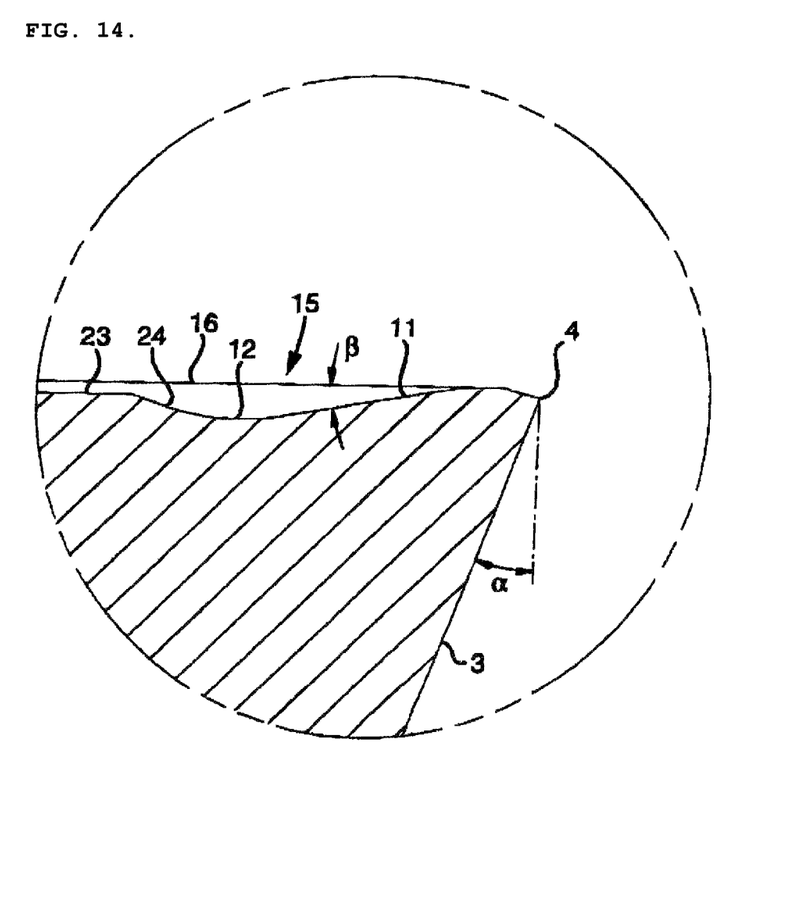
FIG. 14 is a view of a conventional cutting insert.

Korean Patent Publication No. 10-2006-0100287 discloses an example of a conventional art as the one illustrated in FIG. 14, in which a cutting insert includes a rake surface 11, corresponding to a cutting edge rake surface, which is inclined at a predetermined angle (β) to a bottom surface 12 and is planar. However, since the rake surface is on a flat plane, friction is generated between almost entire rake surface plane and the chip, causing shortened life span of the cutting insert. Further, because the heat radiating area is limited to the planar rake surface only, problem such as adhesion of the chip onto the cutting insert by the heat is experienced.

DETAILED DESCRIPTION OF THE INVENTION

Technical Object

The present invention has been made to overcome the problems of the prior art discussed above, and therefore, it is an object of the present invention to provide a cutting insert with minimized friction with a chip and maximized heat-radiating performance.

It is another object of the present invention to provide a cutting insert with improved edge strength and cutting performance by way of optimizing profile of major cutting edge and major cutting edge land surface.

It is yet another object of the present invention to provide a cutting insert from which a chip is easily releasable without being adhered.

Means to Solve the Object

In order to accomplish the above-mentioned objects, the present invention provides a cutting insert which may include an upper surface, a lower surface, a plurality of lateral surfaces connecting the upper surface to the lower surface, a major cutting edge provided between the later surface and the upper surface, and a major cutting edge land surface and a major cutting edge rake surface provided in series between the major cutting edge and the upper surface, in which the major cutting edge rake surface has a first wavy shape in which a rake surface convex part and a rake surface concave part repeat two or more times in a direction from the major cutting edge land surface towards the upper surface.

The major cutting edge rake surface may have a repeat of the rake surface convex part and the rake surface concave part via a plurality of rake surface inflection points.

With reference to a perpendicular height between the lower surface and the upper surface, locations of the plurality of rake surface inflection points may be gradually lowered in a direction from the major cutting edge land surface towards the upper surface.

Further, the plurality of rake surface inflection points may include a first, second, third, fourth, fifth and sixth rake surface inflection points in order along a direction from the major cutting edge land surface towards the upper surfaces, in which case the locations of the first, second and third rake surface inflection points may be gradually lowered, while the locations of the fourth, fifth and sixth rake surface inflection points may be gradually raised.

According to an embodiment of the present invention, the cutting insert may additionally include a minor cutting edge provided between the lateral surface and the upper surface and extended from the major cutting edge, a corner cutting edge provided between a corner of the lateral surface and a corner of the upper surface, a minor cutting edge land surface and a minor cutting edge rake surface provided in series between the minor cutting edge and the upper surface, and a corner cutting edge land surface and a corner cutting edge rake surface provided in series between the corner cutting edge and the upper surface, in which the major cutting edge is positioned between the corner cutting edge and the minor cutting edge.

In one example, the major cutting edge may have a second wavy shape in which a major cutting edge convex part and a major cutting edge concave part repeat two or more times in a direction from the corner cutting edge towards the minor cutting edge.

The major cutting edge may have a repeat of the major cutting edge convex part and the major cutting edge concave part via a plurality of inflection points.

The plurality of inflection points may be at same height to each other, with reference to a perpendicular height between the lower surface and the upper surface.

The plurality of major cutting edge inflection points may be arranged at uniform intervals in a direction from the corner cutting edge towards the minor cutting edge.

The major cutting edge rake surface may include a plurality of protrusions formed in a direction from the corner cutting edge rake surface towards the minor cutting edge rake surface, in an elongate line that is perpendicular to the major cutting edge.

At least two of the plurality of protrusions may be positioned on concave part extension lines of the major cutting edge concave parts, and the concave part extension lines may be in a line that is perpendicular to the major cutting edge.

In another example, the main cutting edge may be so shaped that height thereof is lowered in a direction from the corner cutting edge towards the minor cutting edge, at an increasing degree of such lowering of height due to presence of a plurality of major cutting edge slope parts.

The major cutting edge may include the plurality of major cutting edge slope parts, and play, as a whole, a role of the cutting edge.

The major cutting edge may be gradually lowered due to presence of the plurality of major cutting edge slope parts, may make a curve at the minor cutting edge, and be extended from the cutting edge.

A plurality of protrusions may be formed on the major cutting edge rake surface in a direction from the corner cutting edge rake surface towards the minor cutting edge rake surface, in an elongate line that is perpendicular to the major cutting edge, at least one of the plurality of protrusions may be positioned between slope part extension lines of the plurality of major cutting edge slope parts, and the respective slope part extension lines may be lines that are perpendicular to the major cutting edge.

Effect of the Invention

According to the present invention, a cutting insert provide the following effects.

According to embodiments of the present invention, due to the first wavy shape of the major cutting edge rake surface, chips cut off from the workpiece are rarely contacted with part of the major cutting edge rake surface (i.e., with rake surface concave parts). Accordingly, friction of the chips is minimized.

Further, according to embodiments of the present invention, because the major cutting edge rake surface has increased area due to the first wavy shape thereof, area of radiating heat increases and as a result, efficiency of radiating heat from the cutting can be improved.

Further, according to embodiments of the present invention, because the major cutting edge has either second wavy shape or has such a shape that is bordering the major cutting edge rake surface and having gradually lowered height, contact area with the workpiece can be distributed uniformly, and edge strength of the major cutting edge can be improved due to uniform distribution of machining load. Furthermore, because it is possible to increase feed speed of the cutting tool due to reduced machining load, cutting efficiency including productivity increases.

Further, according to embodiments of the present invention, because a plurality of parallel protrusions are formed in an elongate line that is perpendicular to the major cutting edge, chips cut off from the workpiece can be released smoothly, without being adhered to each other. Furthermore, because the presence of the plurality of protrusions increases area of radiating heat, heat-radiating performance is further improved.

BRIEF DESCRIPTION OF THE DRAWINGS

The above and/or other aspects and advantages of the present invention will become apparent and more readily appreciated from the following detailed description, taken in conjunction with the accompanying drawings of which.

BEST MODE

Hereinbelow, a cutting insert 100 ('subject cutting insert' hereinbelow) according to one embodiment of the present invention will be explained with reference to the accompanied drawings.

Figure 1:
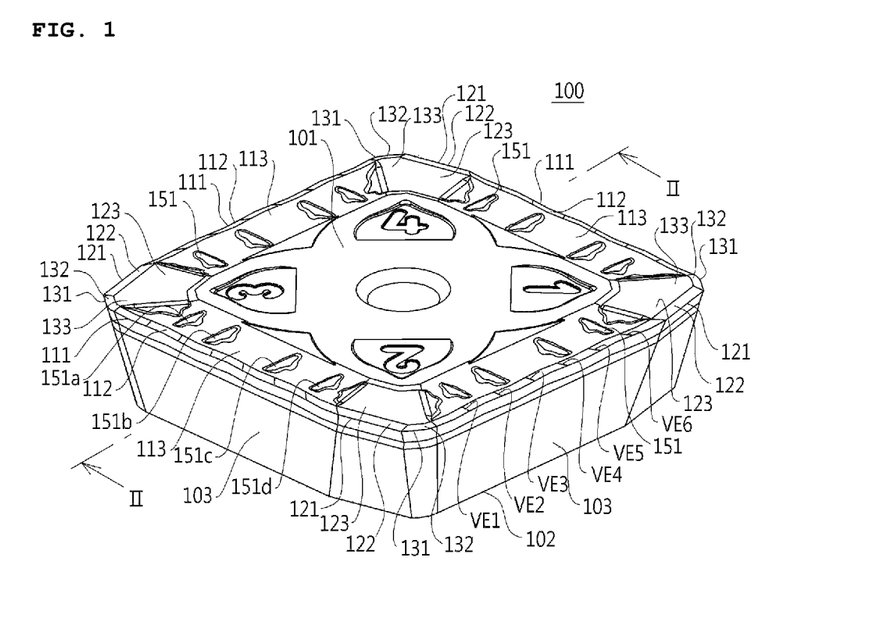
FIG. 1 is a perspective view of a cutting insert according to an embodiment of the present invention.
Figure 2:
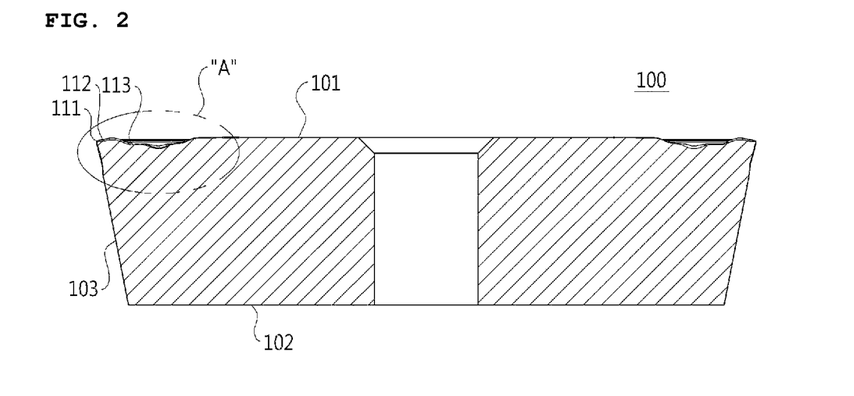
FIG. 2 is a cross-section view taken on line II-II of FIG. 1.
Figure 3:
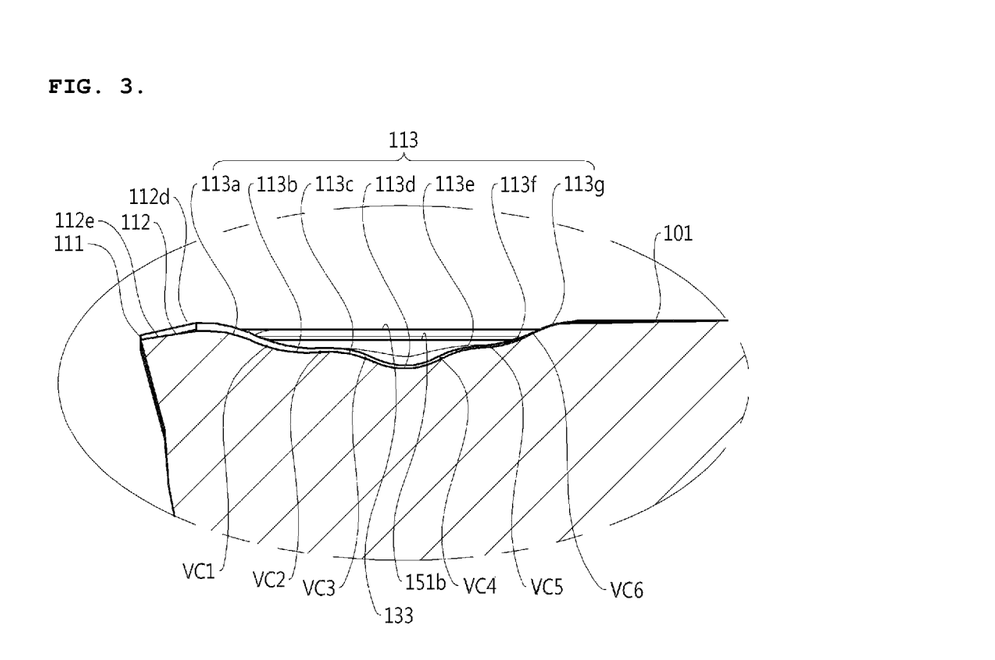
FIG. 3 illustrates encircled area "A" of FIG. 2 in enlarged scale.

FIG. 1 is a perspective view of a cutting insert according to an embodiment of the present invention, FIG. 2 is a cross-section view taken on line II-II of FIG. 1, and FIG. 3 illustrates encircled area "A" of FIG. 2 in enlarged scale.

According to an embodiment of the present invention, the cutting insert may include an upper surface 101, a lower surface 102, a plurality of lateral surfaces 103 for connecting the upper surface 101 with the lower surface 102, a major cutting edge 111 and a minor cutting edge 121 formed between the lateral surface 103 and the upper surface 101, a corner cutting edge 131 provided between corner of the lateral surface 103 and corner of the upper surface 101, in which the major cutting edge 111 is arranged between the corner cutting edge 131 and the minor cutting edge 121, a major cutting edge land surface 112 and a major cutting edge rake surface 113 provided in series between the major cutting edge 111 and the upper surface 101, a minor cutting edge land surface 122 and a minor cutting edge rake surface 123 provided in series between the minor cutting edge 121 and the upper surface 101, and a corner cutting edge land surface 132 and a corner cutting edge rake surface 133 provided in series between the corner cutting edge 131 and the upper surface 101. Further, the corner cutting edge rake surface 133 adjacent to the minor cutting edge rake surface 123 may be formed on the same plane.

As illustrated in FIGS. 1 to 3, the major cutting edge rake surface 113 may have a first wavy shape in which a rake surface convex part 113a and a rake surface concave part 113b are repeated at least two times towards a direction from the main cutting edge land surface 112 to the upper surface 101. Accordingly, friction with the chip (not illustrated) is minimized, because the chip (not illustrated) cut off from the workpiece (not illustrated) rarely contacts the rake surface concave parts 113b, 113d, 113f of the major cutting edge rake surface 113, and efficiency of radiating heat from the cutting is also improved, because the area of the major cutting edge rake surface 113 is increased, thus subsequently increasing area of heat radiation.

The major cutting edge rake surface 113 will be explained in greater detail below with reference to FIG. 3.

The major cutting edge rake surface 113 may have a repeating series of rake surface convex parts 113a and rake surface concave parts 113b by a plurality of rake surface inflection points (VC). For example, the plurality of rake surface inflection points (VC) may include, in series, along a direction from the major cutting edge land surface 112 towards the upper surface 101, a first, second, third, fourth, fifth and sixth rake surface inflection points (VC1, VC2, VC3, VC4, VC5, VC6). In this example, the first rake surface convex part 113*a* and the first rake surface concave part 113*b* may be provided in series with the first rake surface inflection point (VC1) placed therebetween, the first rake surface concave part 113*b* and the second rake surface convex part 113*c* may be provided in series with the second rake surface inflection point (VC2) placed therebetween, the second rake surface convex part 113*c* and the second rake surface concave part 113*d* may be provided in series with the third rake surface inflection point (VC3) placed therebetween, the second rake surface concave part 113*d* and the third rake surface convex part 113*e* may be provided in series with the fourth rake surface inflection point (VC4) placed therebetween, the third rake surface convex part 113*e* and the third rake surface concave part 113*f* may be provided in series with the fifth rake surface inflection point (VC5) placed therebetween, and the third rake surface concave part 113*f* and the fourth rake surface convex part 113*g* may be provided in series with the sixth rake surface inflection point (VC6) placed therebetween.

The plurality of rake surface inflection points (VC) may be at such locations that, with reference to a perpendicular height between the lower surface 102 and the upper surface 101, the height may gradually decrease from the major cutting edge land surface 112 towards the upper surface 101 and then gradually increase. For example, the respective locations of the first, second, and third rake surface inflection points (VC1, VC2, VC3) may be gradually lowered in order, and the respective locations of the fourth, fifth and sixth rake surface inflection points (VC4, VC5, VC6) may be gradually raised in order. As a result, the height may be sequentially lowered in the order of the first and second rake surface convex parts 113*a*, 131*c*, while the height may be sequentially raised in the order of the third and fourth rake surface convex parts 113*e*, 113*g*, thereby leaving the second rake surface concave part 113*d* at the lowest location.

Accordingly, as the chip (not illustrated) is cut off from the workpiece (not illustrated), the chip is moved along the first, second, third and fourth rake surface convex parts 113*a*, 113*c*, 113*e*, 113*g* with minimized contact against the first, second and third rake surface concave parts 113*b*, 113*d*, 113*f*. As a result, friction with the chip can be kept minimal. Further, thanks to the presence of the first, second, third, and fourth rake surface convex parts 113*a*, 113*c*, 113*e*, 113*g*, and the first, second and third rake surface concave parts 113*b*, 113*d*, 113*f*, area of the major cutting edge rake surface 113 is increased, thus leading to increased heat-radiating area. As a result, heat from the cutting process can be radiated with improved efficiency.

For reference, above the wavy line of the major cutting edge rake surface 113 in cross-section of FIG. 3, there is another wave-shaped line which is appeared according to first wavy shape of the major cutting edge land surface 112 (to be explained). That is, as the shape of the major cutting edge land surface 112 influences the shape of the major cutting edge rake surface 113 connected to the major cutting edge land surface 112, this line is in representation of the second land surface convex part 112*d* and the major cutting edge rake surface 113 that follows.

The major cutting edge 111 and the major cutting edge land surface 112 will be explained in detail below with reference to FIGS. 4 to 7.

Figure 4:
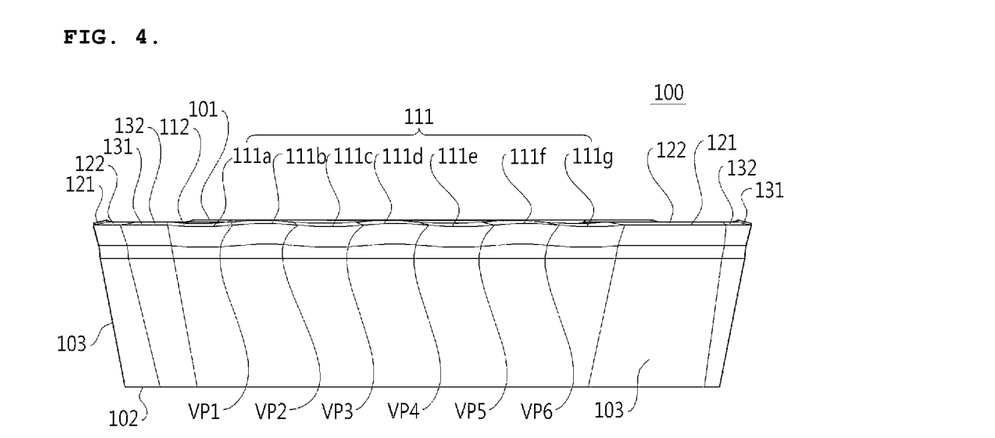
FIG. 4 is a side view of a cutting insert according to an embodiment of the present invention.
Figure 5:
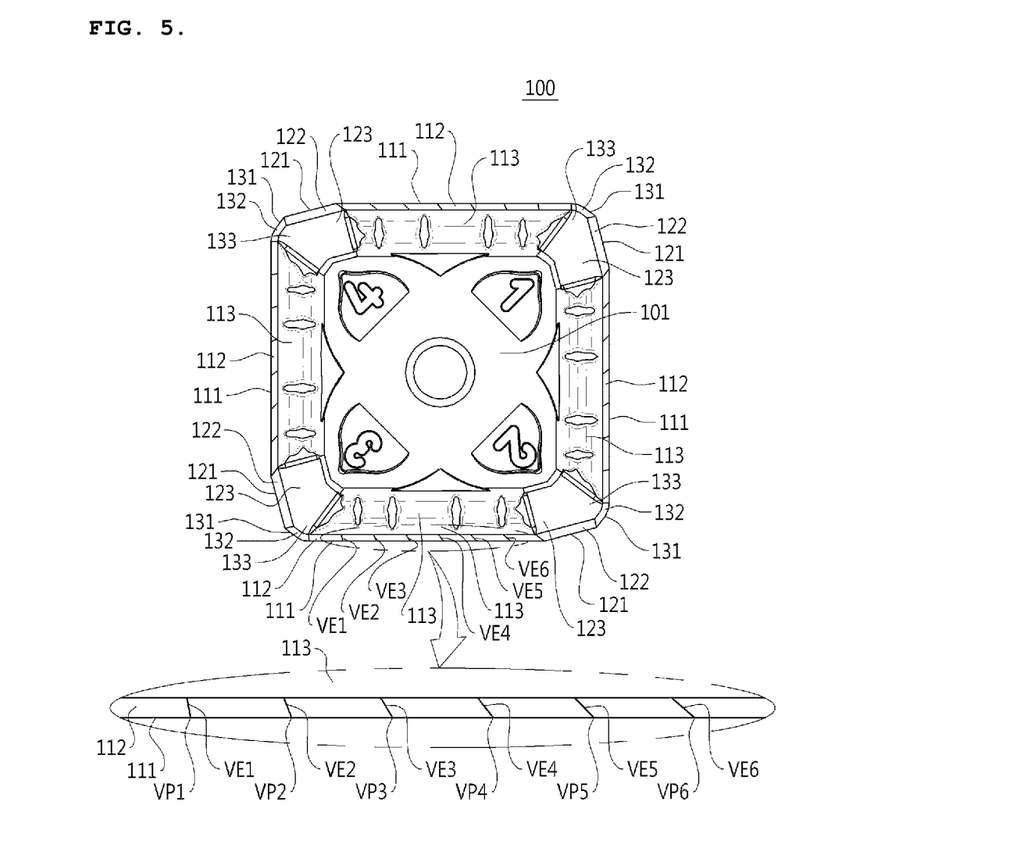
FIG. 5 is a plan view of a cutting insert according to an embodiment of the present invention.
Figure 6:
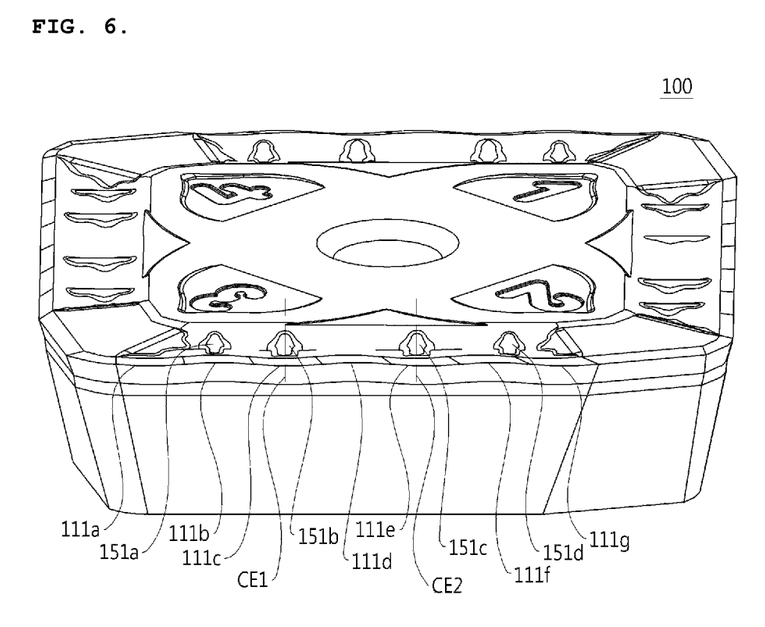
FIG. 6 is a perspective view illustrating relationship between a plurality of protrusions and second wavy shape of the major cutting edge of the cutting insert according to an embodiment of the present invention.
Figure 7:
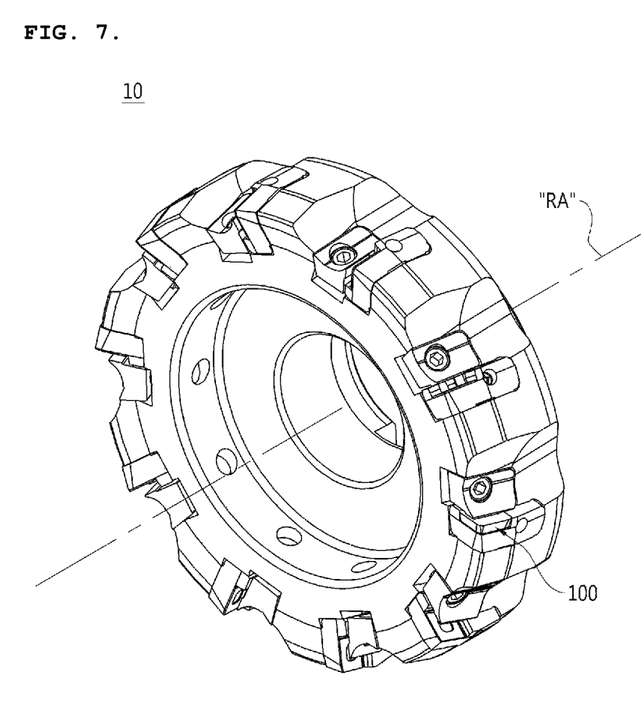
FIG. 7 is a perspective view illustrating a cutting insert according to an embodiment of the present invention being mounted on a cutting tool.

FIG. 4 is a side view of a cutting insert according to an embodiment of the present invention, FIG. 5 is a plan view of a cutting insert according to an embodiment of the present invention, FIG. 6 is a perspective view illustrating relationship between a plurality of protrusions and second wavy shape of the major cutting edge of the cutting insert according to an embodiment of the present invention, and FIG. 7 is a perspective view illustrating a cutting insert according to an embodiment of the present invention being mounted on a cutting tool.

As seen in FIG. 4, the major cutting edge 111 may take second wavy shape in which major cutting edge convex parts 111*a* and major cutting edge convex parts 111*b* repeat at least two times in a direction from the corner cutting edge 131 towards minor cutting edge 121. Accordingly, as the major cutting edge 111 is brought into contact with the workpiece (not illustrated) at the major cutting edge convex part 111*b* and then major cutting edge concave part 111*a* in series, machining load is distributed evenly, and the edge strength of the major cutting edge 111 is improved. Furthermore, since reduced machining load can lead to increased feed speed of the cutting tool (see "10" in FIG. 7), cutting performance including productivity is improved.

More specifically, as seen in FIGS. 4 and 5, the major cutting edge 111 may have a repeating series of the major cutting edge concave parts 111*a* and the major cutting edge convex parts 111*b* via a plurality of major edge inflection points (VP). For example, the plurality of major cutting edge inflection points (VP) may include, in a direction from left-hand side to right-hand side with reference to FIG. 4, a first, second, third, fourth, fifth and sixth major cutting edge inflection points (VP1, VP2, VP3, VP4, VP5, VP6). In this case, the first major cutting edge concave part 111*a* and the first major cutting edge convex part 111*b* may be provided in series with the first major cutting edge inflection point (VP1) placed in between, the first major cutting edge convex part 111*b* and the second major cutting edge concave part 111*c* may be provided in series with the second major cutting edge inflection point (VP2) placed in between, the second major cutting edge concave part 111*c* and the second major cutting edge convex part 111*d* may be provided in series with the third major cutting edge inflection point (VP3) placed in between, the second major cutting edge convex part 111*d* and the third major cutting edge concave part 111*e* may be provided in series with the fourth major cutting edge inflection point (VP4) placed in between, the third major cutting edge concave part 111*e* and the third major cutting edge convex part 111*f* may be provided in series with the fifth major cutting edge inflection point (VP5) placed in between, and the third major cutting edge convex part 111*f* and the fourth major cutting edge concave part 111*g* may be provided in series with the sixth major cutting edge inflection point (VP6) placed in between.

Further, as seen in FIG. 4, the plurality of major cutting edge inflection points (VP) may be at the same height with reference to a perpendicular height between the lower surface 102 and the upper surface 101. For example, with reference to perpendicular height between the lower surface 102 and the upper surface 101, the first, second, third, fourth, fifth and sixth major cutting edge inflection points (VP1, VP2, VP3, VP4, VP5, VP6) may be at the same height.

Further, as seen in FIGS. 4 and 5, the plurality of major cutting edge inflection points (VP) may be arranged at uniform intervals along a direction from a left-hand side to a right-hand side of the drawings. Accordingly, as the major cutting edge 111 is brought into contact with the workpiece (not illustrated) at the major cutting edge convex part 111*b* and then major cutting edge concave part 111*a*, the contact surface of the major cutting edge 111 against the workpiece (not illustrated) is more uniformly distributed. As a result, machining load on the major cutting edge 111 can be distributed more uniformly.

Further, as seen in FIGS. 4 and 5, the major cutting edge land surface 112 may include a plurality of inflection point extension lines (VE) continuing from the plurality of major cutting edge inflection points (VP) respectively, so that the major cutting edge land surface 112 has the same wavy shape as the major cutting edge 111. The plurality of inflection point extension lines (VE) may have inclined shape relative to the major cutting edge 111, respectively. For example, the first, second, third, fourth, fifth and sixth inflection points extension lines (VE1, VE2, VE3, VE4, VE5, VE6) may be extended from the first, second, third, fourth, fifth and sixth land surface inflection points (VP1, VP2, VP3, VP4, VP5, VP6), respectively, in which case each of the first, second, third, fourth, fifth and sixth inflection point extension lines (VE1, VE2, VE3, VE4, VE5, VE6) may have inclined shape relative to the major cutting edge 111, respectively.

Hereinbelow, the plurality of protrusions 151 formed on the major cutting edge rake surface 113 will be explained in detail with reference to FIG. 6.

The plurality of protrusions 151, parallel in a direction from left-hand to right-hand sides of FIG. 6, may be formed on the major cutting edge rake surface 113, and may be in an elongate line to a direction perpendicular to the major cutting edge 111. Accordingly, chips (not illustrated) cut off from the workpiece (not illustrated) may be efficiently released without being adhered with each other. Furthermore, because the presence of the plurality of protrusions 151 increases heat-radiating area, heat-radiating performance can be improved.

More specifically, as seen in FIG. 6, at least two (151*b*, 151*c*) of the plurality of protrusions 151 may be located on the concave part extension lines (CE1, CE2) of the major cutting edge concave parts 111*c*, 111*e*, respectively, and the concave part extension line (CE) may be perpendicular to the major cutting edge 111. For example, the plurality of protrusions 151 may include, in a direction from a left-hand side to a right-hand side of FIG. 6, a first, second, third, and fourth protrusions 151, 152, 153, 154, in which the second and third protrusions 151*b*, 151*c* may be on the concave part extension line (CE1) of the second major cutting edge concave part 111*c* and on the concave part extension line (CE2) of the third major cutting edge concave part 111*e*, respectively. Accordingly, since the chip (not illustrated) cut off by the major cutting edge 111 at the second major cutting edge convex part 111*d* which is in contact with the workpiece (not illustrated) is allowed to be directly and smoothly moved between the second and third protrusions 151*b*, 151*c*, machining load is decreased and therefore, damages such as chipping can be reduced.

The cutting insert according to another embodiment will be explained in detail with reference to FIGS. 8 to 10.

Figure 8:
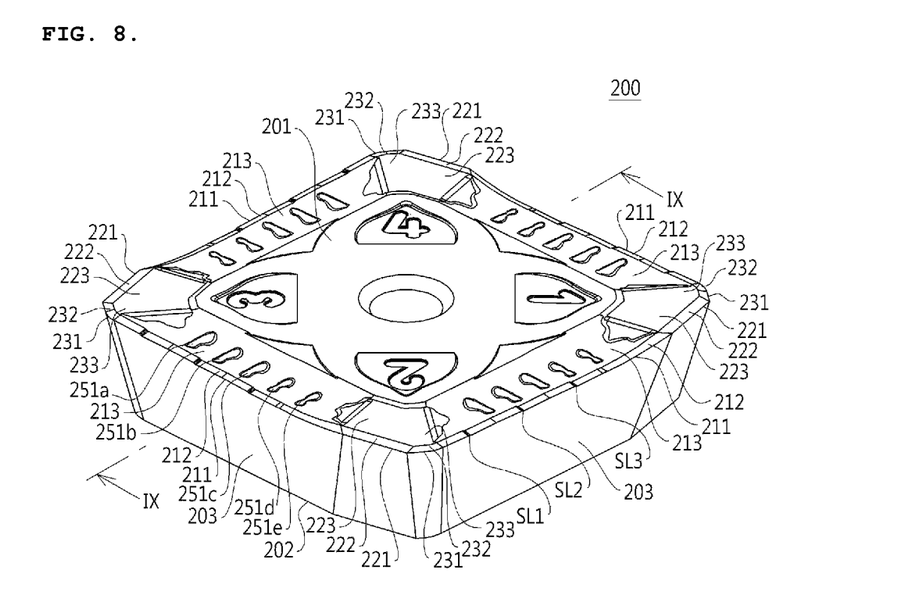
FIG. 8 is a perspective view of a cutting insert according to another embodiment.
Figure 9:
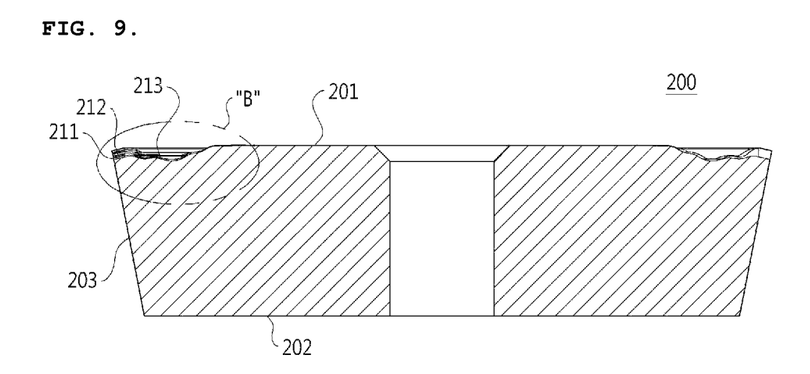
FIG. 9 is a cross-section view taken on line IX-IX of FIG. 8.
Figure 10:
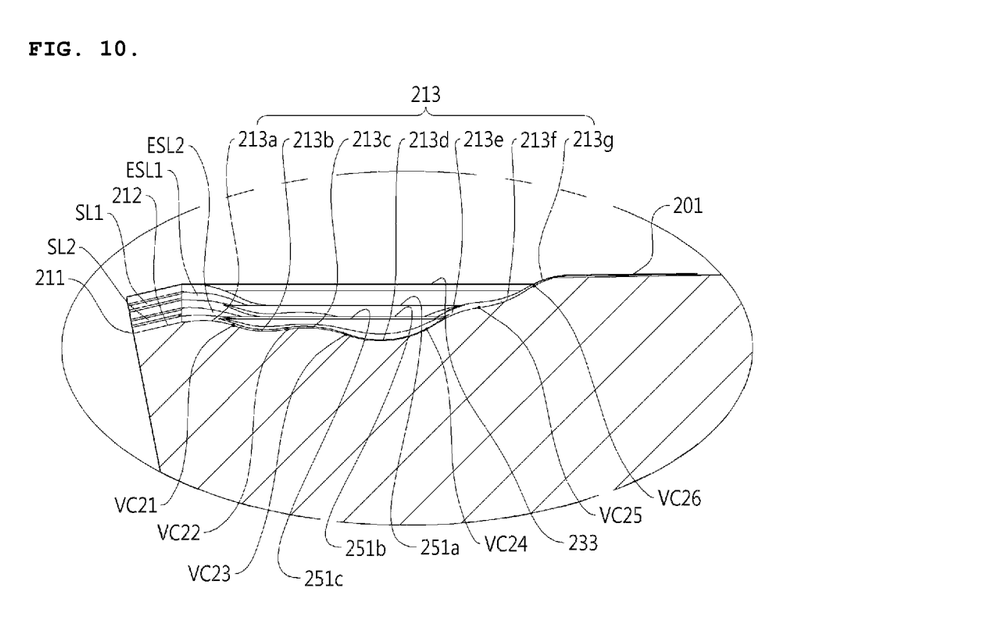
FIG. 10 illustrates the encircled area "B" in enlarged scale.

FIG. 8 is a perspective view of a cutting insert according to another embodiment, FIG. 9 is a cross-section view taken on line IX-IX of FIG. 8, and FIG. 10 illustrates the encircled area "B" in enlarged scale.

As seen in FIGS. 8 to 10, the major cutting edge rake surface 213 may have a first wavy shape, in which the rake surface convex part 213*a* and the rake surface concave part 213*b* are repeated at least two times in a direction from the major cutting edge land surface 212 towards the upper surface 201. Accordingly, because the chip (not illustrated) from the workpiece (not illustrated) is almost not contacted with part of the major cutting edge rake surface 213 (i.e., rake surface concave parts 213*b*, 213*d*, 213*f*), friction with the chip (not illustrated) can be minimized, and the area of the major cutting edge rake surface 213 is increased. As a result, heat-radiating area increase, thus increasing efficiency of radiating heat from the cutting.

Hereinbelow, the major cutting edge rake surface 213 will be explained in detail with reference to FIG. 10.

The major cutting edge rake surface 213 may include repeating rake surface convex part 213*a* and rake surface concave part 213*b* by the presence of the plurality of rake surface inflection points (VC2). For example, the plurality of rake surface inflection points (VC2) may include, in a direction from the major cutting edge land surface 212 towards the upper surfaces, a first, second, third, fourth, fifth and sixth inflection points (VC21, VC22, VC23, VC24, VC25, VC26). The first rake surface convex part 213*a* and the first rake surface concave part 213*b* may be provided in series with the first rake surface inflection point (VC21) placed therebetween, the first rake surface concave part 213*b* and the second rake surface convex part 213*c* may be provided in series with the second rake surface inflection point (VC22) placed therebetween, the second rake surface convex part 213*c* and the second rake surface concave part 213*d* may be provided in series with the third rake surface inflection point (VC23) placed therebetween, the second rake surface concave part 213*d* and the third rake surface convex part 213*e* may be provided in series with the fourth rake surface inflection point (VC24) placed therebetween, the third rake surface convex part 213*e* and the third rake surface concave part 213*f* may be provided in series with the fifth rake surface inflection point (VC25) placed therebetween, and the third rake surface concave part 213*f* and the fourth rake surface convex part 213*g* may be provided in series with the sixth rake surface inflection point (VC26) placed therebewteen.

Further, with reference to a perpendicular height between the lower surface 202 and the upper surface 201, respective locations of the plurality of rake surface inflection points (VC2) may be gradually heightened after being gradually lowered from the major cutting edge land surface 212 towards the upper surface and then gradually raised. For example, the locations of the first, second and third rake surface inflection points (VC21, VC22, VC23) may be sequentially lowered, and the locations of the fourth, fifth and sixth rake surface inflection points (VC24, VC25, VC26) may be raised sequentially. As a result, the first and second rake surface convex parts 213*a*, 213*c* are gradually lowered in height in series, and the third and fourth rake surface convex parts 213*e*, 231*g* are gradually raised in height, thus leaving the second rake surface concave part 213*d* at the lowest location.

Accordingly, the chip (not illustrated) cut off from the workpiece (not illustrated) may be moved along the first, second, third and fourth rake surface convex parts 213*a*, 213*c*, 213*e*, 213*g*, while having minimized contact with the first, second and third rake surface concave parts 213*b*, 213*d*, 213*f* of the major cutting edge rake surface 213, friction with the chip can be minimized. Further, because area of the major cutting edge rake surface 213 is increased due to presence of the first, second, third and fourth rake surface convex parts 213*a*, 213*c*, 213*e*, 213*g* and the first, second and third rake surface concave parts 213*b*, 213*d*, 213*f*, heat-radiating area increases, and the efficiency of radiating heat from the cutting can be improved.

For reference, the embodiment illustrated in FIG. 10 is different from the embodiment illustrated in FIG. 3, due to influence of different shape of the major cutting edge land surface 212 (to be explained below) on the shape of the major cutting edge rake surface 213 which follows the major cutting edge land surface 212. That is, the wavy lines in different shapes above the first wavy shape of the major cutting edge rake surface 212 bordering these lines in cross-section, include lines of the major cutting edge land surface 212 bordering the second land surface slope part (SL2) and the major cutting edge rake surface 213 following the same, and lines of the major cutting edge land surface 212 bordering the first land surface slope part (SL1) and the major cutting edge rake surface 213 following the same.

Hereinbelow, the major cutting edge 211 and the major cutting edge land surface 212, and the major cutting edge rake surface 213 will be explained in greater detail with reference to FIGS. 11 to 13.

Figure 11:
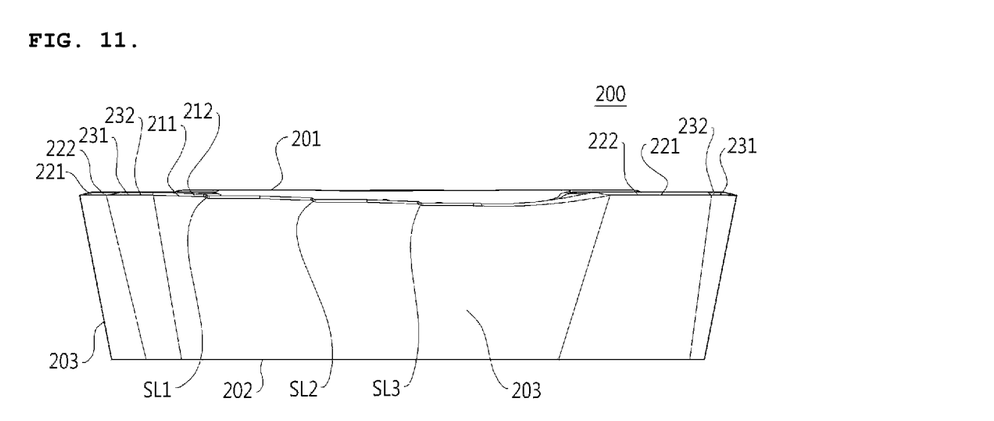
FIG. 11 is a side view of a cutting insert according to another embodiment of the present invention.
Figure 12:
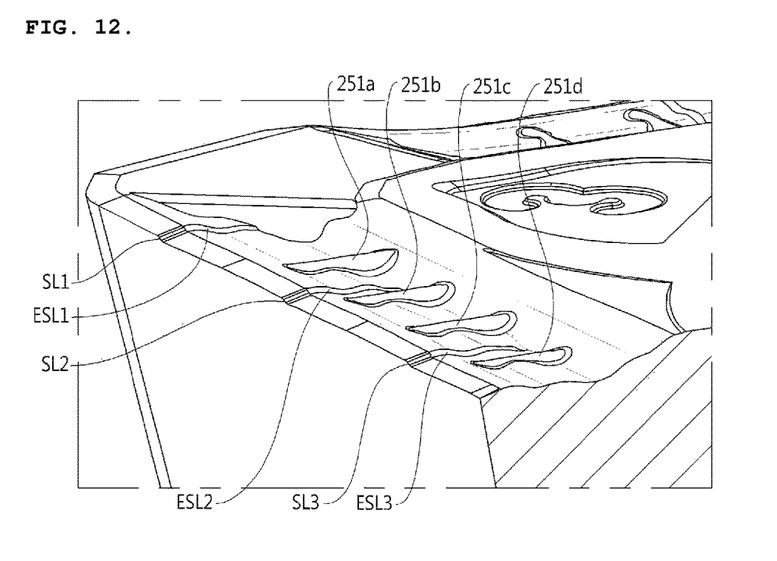
FIG. 12 is a perspective view of the shape of the main part of the cutting insert, i.e., the major cutting edge, the major cutting edge land surface and the major cutting edge rake surface viewed at different angles, according to another embodiment of the present invention.
Figure 13:
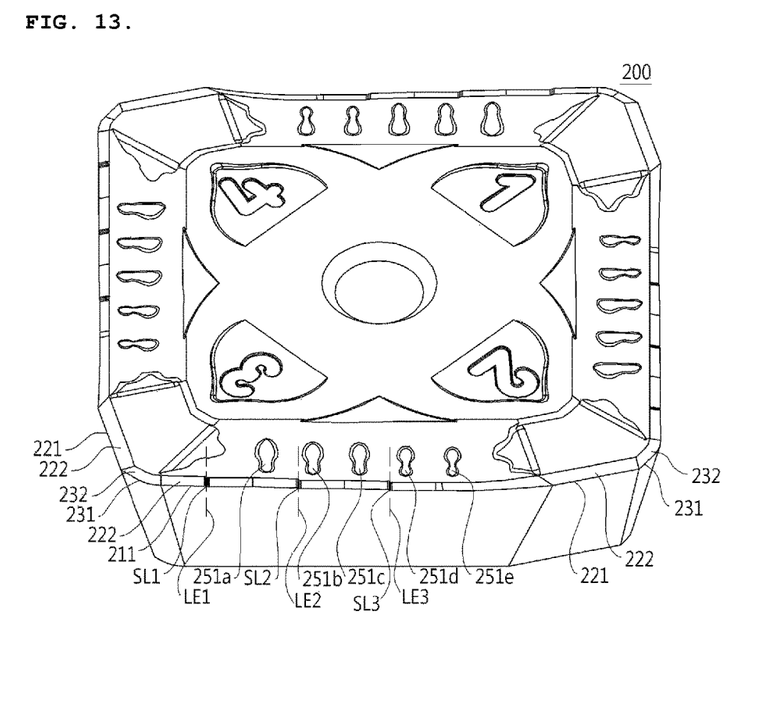
FIG. 13 is a perspective view of a cutting insert viewed from a front direction, to explain relationship between a plurality of protrusions and major cutting edge rake surface, according to another embodiment of the present invention.

FIG. 11 is a side view of a cutting insert according to another embodiment of the present invention, FIG. 12 is a perspective view of the shape of the main part of the cutting insert, i.e., the major cutting edge, the major cutting edge land surface and the major cutting edge rake surface viewed at different angles, according to another embodiment of the present invention, and FIG. 13 is a perspective view of a cutting insert viewed from a front direction, to explain relationship between a plurality of protrusions and major cutting edge rake surface, according to another embodiment of the present invention.

The major cutting edge 211 has such a shape that it is lowered in height in a direction from the corner cutting edge 231 towards the minor cutting edge 221, but at an increasing rate of such lowering due to the presence of the plurality of major cutting edge rake surfaces (SL). For example, along a direction from the corner cutting edge 231 towards the minor cutting edge 221, the plurality of major cutting edge rake surfaces (SL) may include a first, second and third major cutting edge rake surfaces (SL1, SL2, SL3). Accordingly, because the major cutting edge 211 is contacted with the workpiece (not illustrated) in sequence according to varying heights thereof, the machining load is distributed uniformly, and the edge strength of the major cutting edge 211 can be improved. Furthermore, because the feed speed of conveying the cutting tool (see "10" of FIG. 7) is increased under reduced machining load, cutting efficiency including productivity can be improved.

More specifically, when the major cutting edge slope part (SL) continues along the major cutting edge land surface 212 and the major cutting edge rake surface 213, the major cutting edge rake surface 213 is so shaped that it has lowered height at the corner cutting edge rake surface 233 towards a direction of the minor cutting edge rake surface 223, at an increasing rate of such lowering of height due to presence of the plurality of rake surface slope part (ESL). For example, the plurality of rake surface slope parts (ESL) may include a first, second and third major cutting edge slope parts (SL1, SL2, SL3) and a first, second and third rake surface slope parts (ESL1, ESL2, ESL3) that follow, respectively.

Further, the major cutting edge 211 may include a plurality of major cutting edge slope parts (SL) to perform, as a whole, the function of a cutting edge. Accordingly, because the major cutting edge 211 including a plurality of major cutting edge slope parts (SL) performs a function of the cutting edge, machining load is reduced, and feeding the cutting tool can be performed with increased speed. As a result, cutting efficiency can be improved.

Further, the major cutting edge 211 may be gradually lowered due to the plurality of manor cutting edge slope parts (SL), and make a curve at the minor cutting edge 211 to be then extended to the minor cutting edge 221.

Hereinbelow, the plurality of protrusions 251 formed on the major cutting edge rake surface 213 will be explained in detail with reference to FIG. 13.

Referring to FIG. 13, the major cutting edge rake surface 213 includes a plurality of protrusions 251 in parallel relationship along a direction from a left-hand side to a right-hand side, and in an elongate line along a direction perpendicular to the major cutting edge 211. At least one of the plurality of protrusions 251 may be positioned between each of the slope part extension lines (LE), and the respective slope part extension lines (LE) may be in a line that is perpendicular to the major cutting edge 211. For example, the plurality of protrusions 251 may include a first, second, third, fourth and fifth protrusions 251a, 251b, 251c, 251d, 251e, in which the first protrusions 251a may be positioned between the slope part extension line (LE1) of the first major cutting edge slope part (SL1) and the slope part extension line (LE2) of the second major cutting edge slope part (SL2), and the second and third protrusions 251b, 251c may be positioned between the slope part extension line (LE2) of the second major cutting edge slope part (SL2) and the slope part extension line (LE3) of the third major cutting edge slope part (SL3). Accordingly, chips cut off from the workpiece (not illustrated) may be efficiently released, without being adhered to each other. Furthermore, because the presence of the plurality of protrusions 251 further increases heat-radiating area, heat-radiating performance can be further improved.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

INDUSTRIAL APPLICABILITY

The present invention is applicable to a cutting insert for the processing of industrial machine parts, etc.

What is claimed is:
1. A cutting insert, comprising:
an upper surface, a lower surface, a plurality of lateral surfaces connecting the upper surface to the lower surface, a major cutting edge provided between the lateral surface and the upper surface, and a major cutting edge land surface and a major cutting edge rake surface provided in series between the major cutting edge and the upper surface,
wherein:
the major cutting edge rake surface has a first wavy shape in which a rake surface convex part and a rake surface concave part repeat two or more times in a direction from the major cutting edge land surface towards the upper surface;
the cutting insert further comprises a minor cutting edge provided between the lateral surface and the upper surface and extended from the major cutting edge, and a corner cutting edge provided between a corner of the lateral surface and a corner of the upper surface; and
the major cutting edge is positioned between the corner cutting edge and the minor cutting edge, and has a second wavy shape in which a major cutting edge convex part and a major cutting edge concave part repeat two or more times in a direction from the corner cutting edge towards the minor cutting edge.

2. The cutting insert of claim 1, wherein the major cutting edge rake surface has a repeat of the rake surface convex part and the rake surface concave part via a plurality of rake surface inflection points, and with reference to a perpendicular height between the lower surface and the upper surface, respective locations of the plurality of rake surface inflection points are gradually heightened after being gradually lowered in a direction from the major cutting edge land surface towards the upper surface.

3. The cutting insert of claim 1, further comprising a minor cutting edge land surface and a minor cutting edge rake surface provided in series between the minor cutting edge and the upper surface, and a corner cutting edge land surface and a corner cutting edge rake surface provided in series between the corner cutting edge and the upper surface.

4. The cutting insert of claim 3, wherein the major cutting edge has a repeat of the major cutting edge convex part and the major cutting edge concave part via a plurality of major cutting edge inflection points, and the plurality of major cutting edge inflection points are at same height to each other, with reference to a perpendicular height between the lower surface and the upper surface.

5. The cutting insert of claim 4, wherein the plurality of major cutting edge inflection points are arranged at uniform intervals in a direction from the corner cutting edge towards the minor cutting edge.

6. The cutting insert of claim 4, wherein the major cutting edge rake surface comprises:

a plurality of protrusions formed in a direction from the corner cutting edge rake surface towards the minor cutting edge rake surface, having an elongated shape in a direction that is perpendicular to the major cutting edge, wherein at least two of the plurality of protrusions are respectively positioned on concave part extension lines of the major cutting edge concave parts, and the concave part extension lines are lines that are perpendicular to the major cutting edge.

7. The cutting insert of claim 3, wherein the main cutting edge is so shaped that height thereof is lowered in a direction from the corner cutting edge towards the minor cutting edge, at an increasing degree of such lowering of height due to presence of a plurality of major cutting edge slope parts.

8. The cutting insert of claim 7, wherein the major cutting edge comprises the plurality of major cutting edge slope parts, and play, as a whole, a role of the cutting edge.

9. The cutting insert of claim 7, wherein the major cutting edge is gradually lowered due to presence of the plurality of major cutting edge slope parts, makes a curve at the minor cutting edge, and extended from the minor cutting edge.

10. The cutting insert of claim 7, wherein a plurality of protrusions are formed on the major cutting edge rake surface in a direction from the corner cutting edge rake surface towards the minor cutting edge rake surface, having an elongated shape in a direction that is perpendicular to the major cutting edge, at least one of the plurality of protrusions is positioned between respective slope part extension lines of the plurality of major cutting edge slope parts, and the respective slope part extension lines are lines that are perpendicular to the major cutting edge.

* * * * *